(Model.)
A. LANDIS, Sr.
WAGON RACK.
No. 269,685. Patented Dec. 26, 1882.
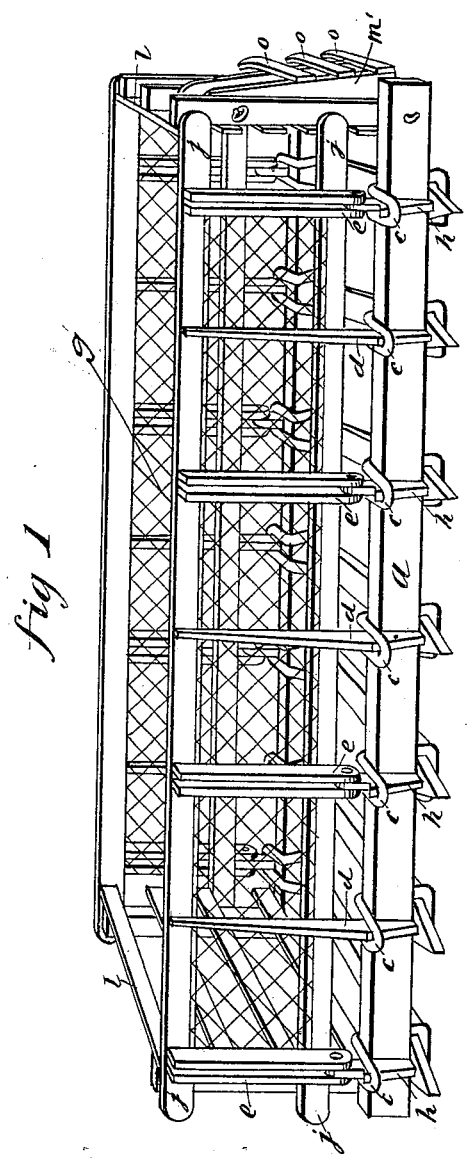
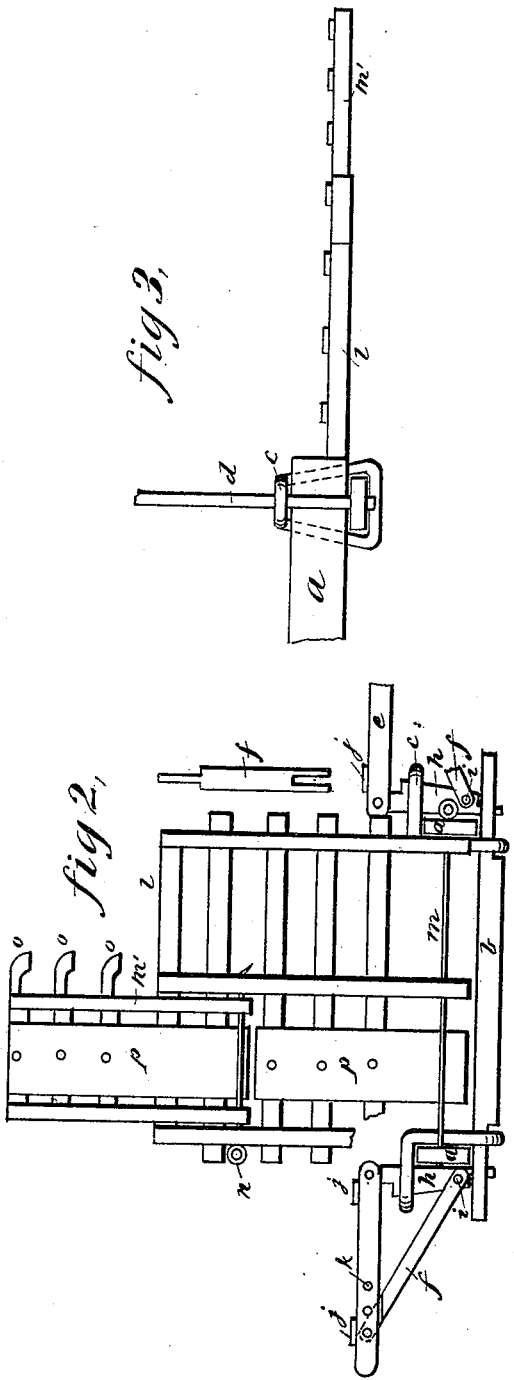
WITNESSES:
Chas. T. Howell,
C. Sedgwick
INVENTOR:
A. Landis Sr.
BY Munn & Co.
ATTORNEYS.

UNITED STATES PATENT OFFICE.

ABRAHAM LANDIS, SR., OF ELKPORT, IOWA.

WAGON-RACK.

SPECIFICATION forming part of Letters Patent No. 269,685, dated December 26, 1882.

Application filed August 29, 1882. (Model.)

*To all whom it may concern:*

Be it known that I, ABRAHAM LANDIS, Sr., of Elkport, in the county of Clayton and State of Iowa, have invented a new and Improved Combined Wood and Hay Rack, of which the following is a full, clear, and exact description.

The invention consists of simple contrivances for readily converting a wood-rack into a hay-rack, which is also adjustable to proper conditions for carrying bags of grain and the like, and has an attachment for securing the binding-pole usually employed to secure the hay on the rack, said attachment being also useful as an end-gate attachment to facilitate the loading of heavy parcels, all as hereinafter fully described.

Reference is to be had to the accompanying drawings, forming part of this specification, in which similar letters of reference indicate corresponding parts in all the figures.

Figure 1 is a perspective view of my improved combined wood and hay rack as adjusted for carrying bags and the like. Fig. 2 is an end elevation, showing the adjustment for the hay-rack; and Fig. 3 is a detail showing the adjustment of the binding-pole device as the end-gate attachment to facilitate the loading of heavy goods.

The wood-rack consists of the bed-frame *a b*, stake-holders *c*, and the stakes *d*, which I convert into a hay-rack by substituting the jointed stakes *e*, braces *f*, and the rack sides *g*, the braces *f*, being forked at the lower ends to embrace the lower sections, *h*, of the stakes and be fastened by the pins *i*, and at the upper ends being fastened by pins *j* between the two bars of the upper sections of said stakes, where a series of pin-holes, *k*, is employed to adjust the height of the racks *g*, and said racks consisting of any suitable framing or bars with wire net-work stretched on them.

The conversion is effected by taking out the stakes *d* and swinging down and bracing the stakes *e*. Suitable end-gates, *l*, will be fitted to the ends of the rack by pivot-rods *m*, so as to be used or not, as required, said ends being removable by taking out the rods; but when the rack is to be used, as in Fig. 1, these ends will be connected and will be fastened at the top to the sides *g* in any approved manner.

I also propose to utilize the gates for securing the binding-pole of a hay-load by pivoting an attachment, *m'*, onto them, as at *n*, said attachment being capable of swinging up in the position represented in Fig. 2, and having one or more hook-ended bars, *o*, suitably located with respect to the center of the load and at different heights, so as to secure the pole higher or lower, as the size of the load may demand. This attachment may be turned down out of the way on its pivot when not wanted for use; or it may be taken off. To the rear end-gate, and also to this attachment *m'*, I secure the boards *p*, to enable them to serve as a platform, Fig. 3, to be supported at any suitable height by any applied means over which to load and unload animals or heavy packages. The sides *g* and ends *l* will be taken off, also the stakes *e*, when the rack is to be used for wood, and stakes *d* will be taken off when the rack is used for hay. When used as in Fig. 1 the stakes *d* will be used; but some of the other stakes may be used, if desired. By shifting the stakes *d* around—that is, placing the straight sides out and the tapered sides in—the sides *g* may be opened at the top, suitable for gathering corn in the husking season, and for other purposes requiring more space than as represented in Fig. 1, but not so much as when used for hay.

Having thus fully described my invention, I claim as new and desire to secure by Letters Patent—

1. The combination, with frame *a b*, having holders *c*, of the joint-stakes *e*, the forked braces *f*, the side racks, *g*, and the pins *i j*, passing through holes in the ends of said stakes to form a hay-rack, as described.

2. The combination, with bed-frame *a b*, having holders *c*, and the side racks, *g*, of the stakes *d*, made straight on one side and tapered on an opposite side, whereby the rack may be adapted to hauling wood or corn, as described.

3. The combination of the boards *p* with the end-gate *l* and pole attachment *m'*, substantially as described.

4. The hay-pole attachment *m'*, hinged to the end-gate at *n* and provided with hook-ended bars *o*, substantially as shown and described.

5. The pivoted slat attachment *m'*, having board *p* to strengthen it while acting as an extension loading-platform, as set forth.

ABRAHAM LANDIS, SR.

Witnesses:
M. GARBER,
JOSEPH BROEDERICK.